May 17, 1949.　　　C. G. HOWSE　　　2,470,169
MECHANICAL MILKING APPARATUS
Filed Nov. 15, 1945
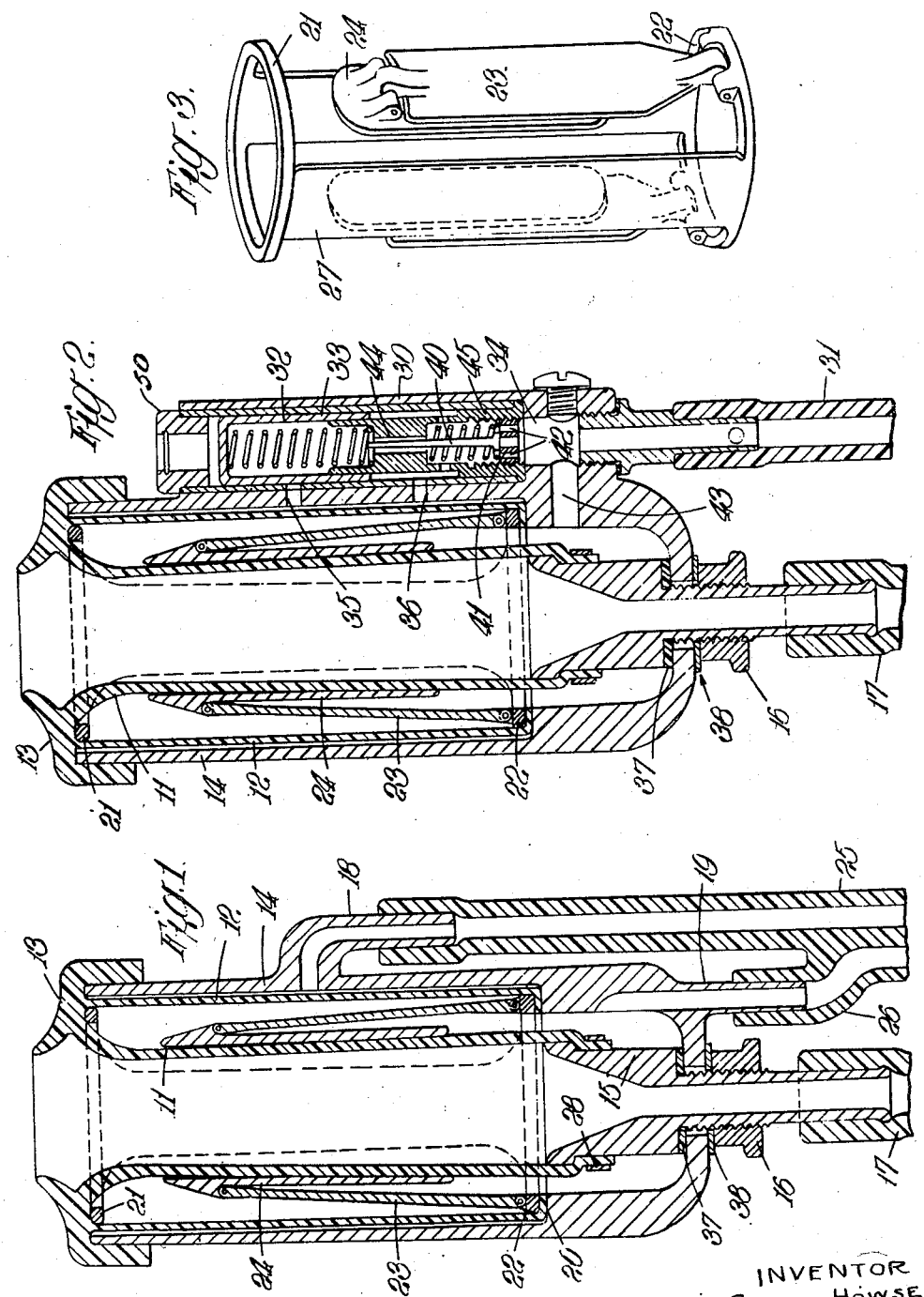
INVENTOR
Cyril George Howse
By
his ATTY.

Patented May 17, 1949

2,470,169

UNITED STATES PATENT OFFICE 2,470,169

MECHANICAL MILKING APPARATUS

Cyril George Howse, Farmoor, Botley, England

Application November 15, 1945, Serial No. 628,702
In Great Britain January 11, 1945

9 Claims. (Cl. 31—67)

This invention relates to mechanical milking appliances and concerns particularly an improved teat cup for such machines. Its object is to create as far as possible conditions resembling closely the natural action on the teat of a cow for withdrawal of the milk, avoiding any tendency to restrict the natural flow of the milk from the udder to the teat and to prevent completely any action which would tend to create a counter flow to the milk which action, clearly, in addition to being painful to the cow is quite likely to foster the dissemination of germs in the udder.

The teat cup of this invention ensures that a steady and controlled pressure is applied to the teat of a cow from the end nearest the udder progressively to the outlet for natural milk extraction and that there is not created a counter pressure in the flow. This action positively excludes discomfort or harmful effects to the cow, results in the udder retaining its natural soft texture, precludes the possibility of contamination, enables the natural process of refilling the teat to proceed unhindered and ensures that the cow will yield freely and fully, avoiding any necessity for finishing the milking by hand, which is sometimes found necessary with milking machines at present in use. Thus a greater number of animals can be milked in a given time without the necessity of employing skilled milkers.

By employing the teat cup of this invention the natural action of a suckler on the teat of a cow is closely imitated.

According to the present invention a teat cup for a mechanical milking appliance comprises a metal, plastic, toughened glass or like housing to receive a teat and mechanism (squeeze mechanism) adapted to bear on said teat progressively from the upper to the outlet end, and actuated by pneumatic, hydraulic, mechanical or electric means, or two or more of said means in combination.

Actuation of the teat cup may be, for example, by means of a vacuum pump, having one line connected with the tension tube and drawing a constant vacuum in the inner liner and another line which may combine two separate tubes connected, through the intermediary of a pulsator, to the housing connectors to provide alternating or pulsating vacuum to the compartments of the teat cup to operate the squeeze mechanism.

Usually four teat cups are connected to a common claw of well-known type into which the milk flow from each converges into a common flow tube and which also acts as a convenient distributor for the actuating power.

The pulsator, which may be of the kind shown in British patent specification No. 324,140, may be arranged to provide a variable two-stage cut-off, with two separate flexible tubes connected to the claw and thence distributed to the teat cup compartments or connected directly thereto.

The invention will now be described in detail by way of example reference being had to the accompanying drawings of which—

Figure 1 is a section through a teat cup of the one form,

Figure 2 is a similar view showing a modified form of teat cup, and

Figure 3 is a perspective view of the squeeze mechanism.

Referring now to Figure 1, the teat cup consists of the inner flexible liner 11 open at one end for the reception of the teat, an integral secondary sheath or sleeve 12 and an integral capping 13 which fits over and seals the outer metal cup or housing 14 and at the same time provides a seal for a teat. The liner 11 at its lower end is secured to a tension tube 15 passing through the opening at the bottom of the housing 14, the tension on the liner 11 being held by means of the nut 16. The tension tube 15 is connected by means of a lip and friction collar 28 to a flexible flow tube 17 which is in turn connected to the constant vacuum line of a vacuum pump (not shown). Formed integrally with the cup 14 are connector tubes 18 and 19 adapted to be connected to the vacuum pump via a pulsator. The interior of the cup 14 towards its lower end is shouldered as at 20 which shoulder serves as a seating for the outer flexible sheath 12 which is inturned at its bottom edge and held on the seating by means of the bottom frame ring 22 of the squeeze mechanism retained between the liner 11 and the sheath 12. The squeeze mechanism consists of upper and lower rings 21 and 22 spaced apart by means of diametrically opposed ribs 27 (see Figure 3). To the bottom ring 22 are hinged a pair of thrust fingers or blades 23 extending upwardly from said ring between the liner and the outer sheath to a point approaching the upper end of the liner. Articulated to the upper ends of the fingers 23 are contact blades 24 the greater lengths of which bear against the liner 11 below the points of articulation whilst a shorter length bears similarly above the points of articulation. Flexible pulsator vacuum tubes 25 and 26 are connected to the upper and lower connectors 18 and 19 respectively. The tensioning of the flexible liner by adjustments of the nut 16 locates the squeeze mechanism and supplementary sheath on the seating 20, the necessary pressure to seal the compartment being provided by the elasticity of the liner.

The teat cup outer housing provides the two connectors 18 and 19, connected to the common claw, which in turn is connected to the pulsator, the upper connector 18 providing the actuation for the teat cup compartment between the outer housing and the secondary sheath and the lower connector 19 providing the actuation for the teat cup compartment containing the squeeze mechanism.

Actuation is as follows:

With the teat cup divided into separate compartments as already described, vacuum or atmospheric pressure is maintained within the compartments, controlled by the pulsator to provide either equal vacuum, equal air pressure, or an unequal combination of both vacuum and air pressure separately to the compartments, with the sequence, frequency of action and time lag or overlap controlled and variable by the adjustments provided on the pulsator. Any known pulsator can be used, and the form and construction of the pulsator form no part of the present invention.

Clearly if equal vacuum is drawn in each of the compartments of the teat cup, and equal to the constant vacuum drawn in the flexible liner, the whole of the teat cup mechanism will be in a state of equilibrium, and there will be no pressure upon any part of the mechanism, but by maintaining vacuum within the compartment containing the squeeze mechanism and admitting atmospheric pressure to the compartment between the secondary sheath or sleeve and the outer housing the secondary sheath or sleeve will collapse and exert pressure on the squeeze mechanism, which will bear progressively upon the liner, and steadily expel milk from the teat. Upon completion of this sequence, air pressure is again applied to the squeeze mechanism compartment which will cause the flexible liner to collapse thereby effectively sealing the outlet of the teat and since the compartments of the teat cup are now at equal air pressure, the secondary sheath or sleeve will return to the original position and release the squeeze mechanism pressure from the flexible liner. Equal vacuum is then again drawn upon both compartments of the teat cup releasing the flexible liner which will return to normal conformation enabling the teat to re-fill and the cycle of operations to be repeated, with the frequency variable in any desired degree.

Figure 1 illustrates the preferred form in the condition of equilibrium resulting from equal vacuum within the flexible liner, the squeeze mechanism housing, and within the compartment formed by the secondary sleeve and the outer housing.

It will be clearly understood that application of air pressure to the outer compartment through the upper connector 18 will collapse the sheath 12 on to the thrust blades 23 of the squeeze mechanism, the thrust being entirely obtained on the blades by reason of the diametrically opposed spacers 27 for the upper and lower rings of the frame. This thrust is transferred to the contact blades 24 and, the articulation being intermediately of their length and above the horizontal centre line, pressure is exerted upon the flexible liner and consequently upon the teat of the cow from the uppermost end, increasing pressure causing the contact blades to approach each other at the ends opposite to the articulation and thus create the progressive pressure from the upper end towards the lower end. Following this action, in which the milk is withdrawn from the teat progressively, and constriction to create counter flow is positively eliminated, the application of air pressure to the lower connector 19, the closing of the liner to seal the teat, and the return to the state of vacuum equilibrium will be readily understood. By means of the adjustments provided on the two-stage pulsator it will be clear that this cycle of operations is controllable in any desired degree particularly as to timing, ensuring efficient and natural milking, and is adaptable to the requirements of different animals and herds.

In Figure 2 the arrangement is substantially similar to that shown in Figure 1 and similar parts are designated by like numerals, but in this case the upper and lower connectors 18 and 19 are not used and in place thereof is provided a valve housing 30 formed integrally with the teat cup housing 14 and connected at its lower end to a pulsator tube 31. The valve consists of a plunger 32 reciprocating in a barrel 33 at the lower end of which is a jet chamber 34 housing a spring loaded tapered jet needle 40 upstanding from a collar 41 formed with apertures 42 and screwed into a sleeve 45 having a push fit in the barrel 33. Direct communication with the inner chambers of the teat cup is had on the one hand via the port 43 and on the other hand via the apertures 42 and port 36. Communication with the underside of the plunger is had via the variable jet orifice 44.

The valve is connected at one end to the pulsator, and the other, or plunger crown end 50, is open to atmosphere. Two ports 35 and 36 communicate with the teat cup compartment between the outer housing 14 and the secondary sheath or sleeve 12 so that with the plunger 32, which is spring loaded, at the top of its stroke, the upper port 35 is closed by the plunger wall and the lower port 36 is open to the jet chamber. If then, vacuum is drawn in the jet chamber, the compartments of the teat cup will be evacuated and the plunger will descend at a speed controlled by the setting of the collar 41. In course of descent the plunger wall covers the lower port 36 thus sealing the compartment from the pulsator vacuum line and further descent causes the plunger crown to uncover the upper port 35 to atmosphere, and the squeeze mechanism will operate as previously described, with the frequency of the cycle controlled by the plunger and setting of the collar 41. On completion of the vacuum cycle the plunger returns to its original position under the action of its spring. This alternative valve control is described in some detail as typical of the alternative methods available. The means to effect these methods being auxiliary to, or formed integrally with the teat cups, or arranged as a master unit or units in a conveniently remote location, such for example as on the claw, pulsator, milk collector vessel, or stands, and suitably connected to the teat cup by means of flexible cables, tubes or the like.

I claim:

1. A teat cup for a mechanical milking appliance comprising a cup shaped rigid housing of non-ferrous light alloy open at the upper end and having an outlet at its lower end to which a flexible milk flow tube is secured, means to maintain constant vacuum in said tube, said housing having two connectors to which flexible tubes are connected, means to supply alternating pressure to said connectors, a flexible liner for reception of one teat of a cow, a capping on said flexible liner, squeeze mechanism comprising a pair of contact blades pivoted on thrust blades pivoted on a frame surounding the liner, a secondary flexible sheath disposed between said squeeze mechanism and the housing and means to apply vacuum through said connectors to the spaces between the housing and the secondary sheath and between the secondary sheath and the flexible liner.

2. A teat cup for a mechanical milking appliance comprising a flexible liner for reception of a teat, a housing therefor, squeeze mechanism comprising a pair of blades pivoted on a frame and engaging said liner and a secondary sheath surrounding said squeeze mechanism, a constant pressure being applied to the interior of the liner to withdraw milk and a pressure being applied to the space between the secondary sheath and housing and the space between the liner and the secondary sheath to actuate the squeeze mechanism to expel the milk in a continuous flow.

3. A teat cup for a mechanical milking appliance comprising a flexible liner for reception of a teat, a housing therefor, squeeze mechanism comprising a contact blade pivoted on a thrust blade pivoted on a frame retained within said housing, and means to actuate said blades to bear on said liner and a secondary sheath surrounding said squeeze mechanism.

4. A teat cup for a mechanical milking appliance comprising a flexible liner for reception of a teat, a housing therefor, squeeze mechanism consisting of a pair of contact blades actuated to bear progressively on the liner from the upper to the outlet end, said contact blades being pivoted on thrust blades pivoted on a frame surrounding the liner, and means to apply a constant vacuum to the interior of said liner and a pulsating vacuum to the space between said liner and said housing.

5. A teat cup for a mechanical milking appliance comprising a flexible liner for reception of a teat, a housing therefor, squeeze mechanism comprising a pair of contact blades pivoted on thrust blades pivoted on a frame surrounding the liner, a secondary sheath disposed between the squeeze mechanism and the housing, means to apply a constant vacuum to the interior of the liner and means to apply vacuum in any predetermined sequence to the spaces between the liner and the secondary sheath and between the secondary sheath and the housing.

6. A teat cup for a mechanical milking appliance comprising a flexible liner for reception of a teat, a secondary flexible sheath formed as an integral moulding with said liner and with a capping to close the open end of a housing, and squeeze mechanism comprising a contact blade pivoted on a thrust blade pivoted on a frame arranged between said liner and said secondary sheath.

7. A teat cup for a mechanical milking appliance comprising a flexible liner for reception of a teat, a housing therefor, squeeze mechanism consisting of a pair of contact blades pivoted on thrust blades pivoted on a frame surrounding said liner, a flexible secondary sheath surrounding said squeeze mechanism, a valve body formed integrally with the housing, ports opening into the housing, and a valve movable in said valve body to apply vacuum in any predetermined sequence to the spaces between the liner and the secondary sheath and between the secondary sheath and the housing.

8. A teat cup for a mechanical milking appliance comprising a flexible liner for reception of a teat, a rigid housing therefor, squeeze mechanism surrounding said liner and comprising a pair of thrust blades pivoted at their lower ends on a frame surrounding the liner, and a pair of contact blades articulated intermediately of their length to the upper ends of said thrust blades.

9. A teat cup for a mechanical milking appliance comprising a flexible liner for reception of a teat, a housing therefor consisting of a cup of a nonferrous light metal alloy open at its upper and lower ends, a connector at the lower end of said housing for connection to a flexible out-flow tube, squeeze mechanism comprising a pair of blades pivoted on a frame surrounding said liner, a flexible secondary sheath disposed between said squeeze mechanism and the housing, a cylinder formed integrally with said housing and enclosing a valve co-acting with two ports formed in said housing and opening respectively to the spaces between the liner and the secondary sheath and the secondary sheath and the housing.

CYRIL GEORGE HOWSE.

REFERENCES CITED

The following references are of record in the file of this patent:

UNITED STATES PATENTS

| Number | Name | Date |
| --- | --- | --- |
| 955,732 | Wiggins et al. | Apr. 19, 1910 |
| 1,024,847 | Gillies | Apr. 30, 1912 |
| 1,044,246 | Reid | Nov. 12, 1912 |
| 1,048,481 | Aslakson | Dec. 31, 1912 |
| 1,132,639 | Truchot | Mar. 23, 1915 |
| 1,709,758 | Wallace | Apr. 16, 1929 |
| 2,408,390 | Gessler | Oct. 1, 1946 |